(12) United States Patent
Westman et al.

(10) Patent No.: US 8,282,040 B1
(45) Date of Patent: Oct. 9, 2012

(54) COMPOSITE AIRCRAFT WING

(75) Inventors: Aaron L. Westman, Rochester, MN (US); Todd M. Colten, St. Paul, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 701 days.

(21) Appl. No.: 12/432,901

(22) Filed: Apr. 30, 2009

(51) Int. Cl.
*B64C 1/00* (2006.01)

(52) U.S. Cl. .................................................. 244/123.1

(58) Field of Classification Search ............... 244/123.1, 244/123.12–123.14, 123.2–123.5, 123.7
See application file for complete search history.

(56) References Cited

U.S. PATENT DOCUMENTS

| | | | | |
|---|---|---|---|---|
| 2,693,922 A * | 11/1954 | Ellison et al. | ............... | 244/123.5 |
| 2,728,702 A * | 12/1955 | Simon et al. | ................... | 244/126 |
| 3,645,481 A * | 2/1972 | Purdy | ......................... | 244/123.5 |
| 3,937,425 A * | 2/1976 | Harvey | ....................... | 244/123.5 |
| 4,329,119 A * | 5/1982 | Baskin | .......................... | 416/226 |
| 4,422,229 A * | 12/1983 | Sadler et al. | ............. | 29/889.721 |
| 4,536,438 A | 8/1985 | Bishop et al. | | |
| 4,671,471 A * | 6/1987 | Patmont | ..................... | 244/123.5 |
| 4,997,688 A * | 3/1991 | Hardman | ..................... | 428/34.9 |
| 5,035,094 A | 7/1991 | Legare | | |
| 5,402,969 A * | 4/1995 | Shea | .............................. | 244/36 |
| 5,941,446 A * | 8/1999 | Yasui | .............................. | 228/157 |
| 6,159,574 A * | 12/2000 | Landvik et al. | ................. | 428/71 |
| 6,541,094 B1 * | 4/2003 | Landvik et al. | ................. | 428/71 |
| 7,203,628 B1 | 4/2007 | St. Ville | | |
| 7,976,275 B2 * | 7/2011 | Miebach et al. | ................ | 416/61 |
| 8,031,445 B2 * | 10/2011 | Zhou et al. | ............... | 360/324.12 |
| 2002/0003188 A1 | 1/2002 | Moshier | | |

FOREIGN PATENT DOCUMENTS

GB          2 315 723 A      2/1998

* cited by examiner

*Primary Examiner* — Richard Price, Jr.
(74) *Attorney, Agent, or Firm* — Hamre, Schumann, Mueller & Larson, P.C.

(57) ABSTRACT

A composite aircraft wing that includes a core, a first composite material disposed over the upper surface of the core, and a second composite material over the lower surface of the core. The second composite material is a different composite material than the first composite material. In addition, a first wood veneer layer is disposed over the first composite material and a second wood veneer layer disposed over the second composite material. The wing is lightweight, has an airfoil shape, and is easy to construct without using molds, while also being strong enough to support the weight of the aircraft. When used on a UAV-type aircraft having a wing-mounted antenna, the wing construction has little or no RF impact on the antenna.

6 Claims, 3 Drawing Sheets

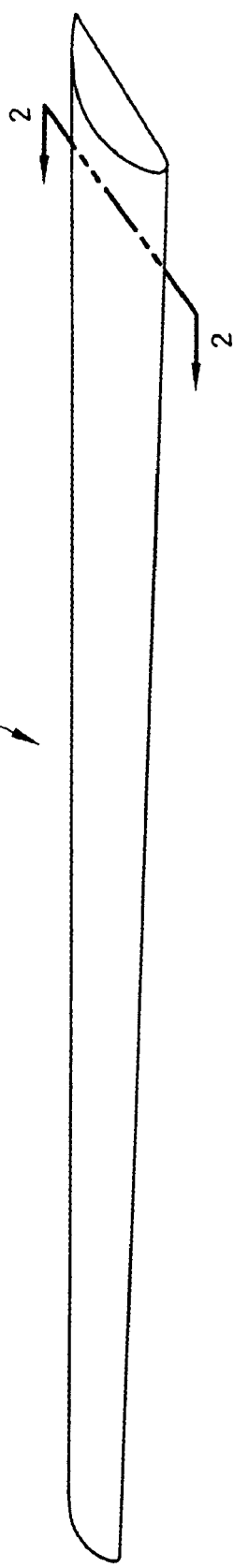
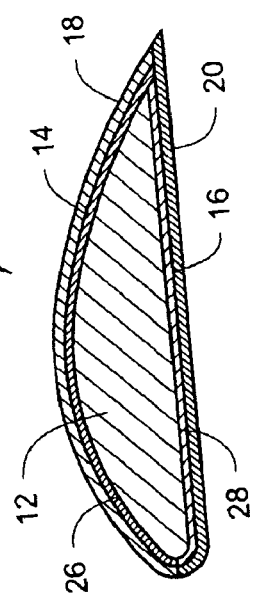

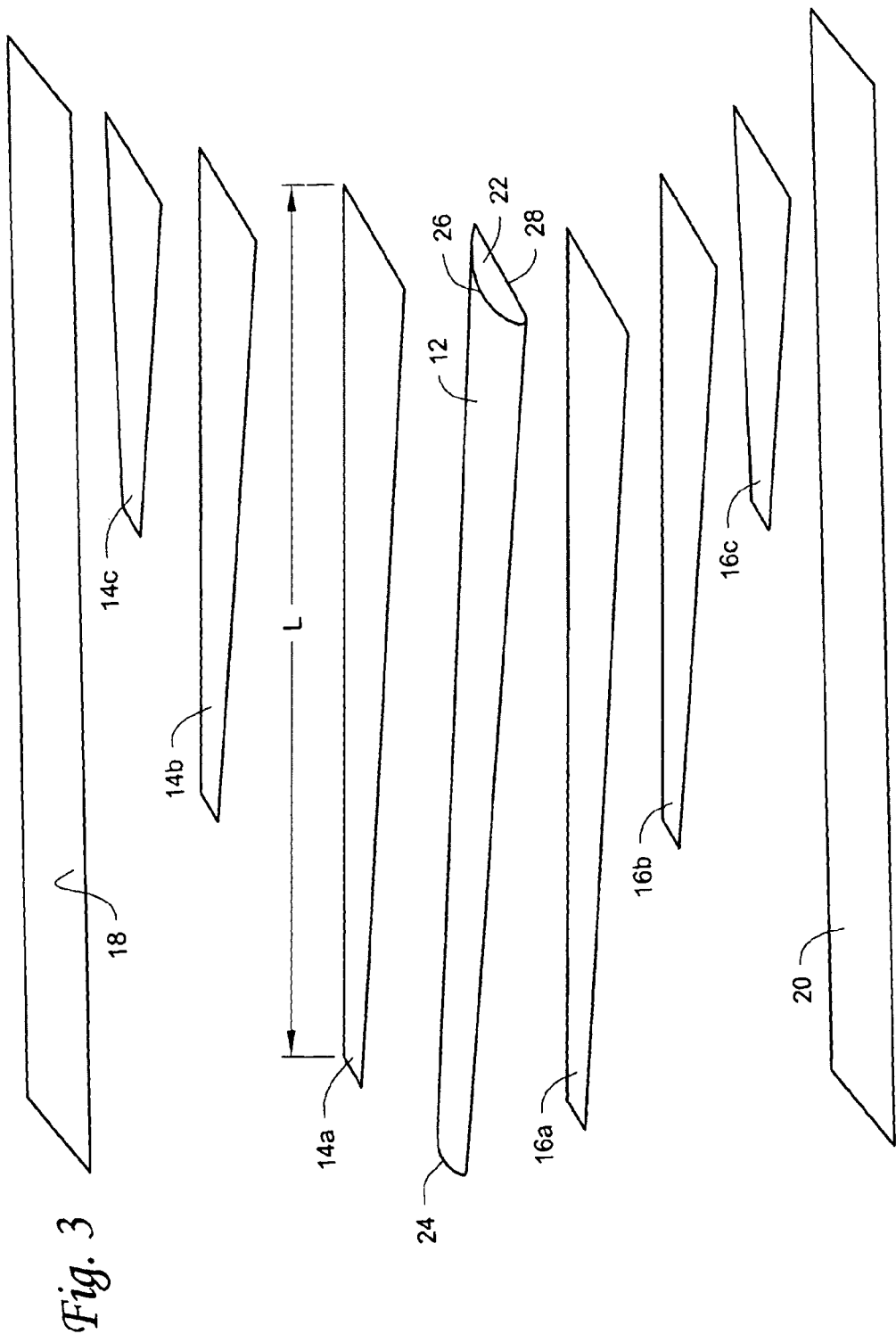

COMPOSITE AIRCRAFT WING

FIELD

This disclosure relates to aircraft wings and other lift generating structures.

BACKGROUND

The wings of an aircraft need to be strong enough to support the weight of the aircraft and have the proper airfoil shape to achieve the desired aerodynamic characteristics, particularly lift. In the case of an unmanned aerial vehicle (UAV), it is known to construct the wings of the UAV using a foam core that is laminated with plywood veneer layers, each having a thickness of about 0.0625 inch, to provide torsional stiffness and a smooth exterior surface.

SUMMARY

A composite aircraft wing and method of constructing the wing are described. The wing is lightweight, has an airfoil shape, and is easy to construct, while also being strong enough to support approximately half the weight of the aircraft. The wing can be used on any type of aircraft, but is especially suited for use with UAV-type aircraft. In the case of an UAV, the wing construction is chosen so as to have little or no radio frequency impact on wing-mounted antennas.

In one embodiment, an aircraft wing includes a core having an airfoil shape with an upper surface and a lower surface. A first composite material is disposed over the upper surface, and a second composite material over the lower surface. The second composite material is a different composite material than the first composite material. For example, the first composite can be a carbon fiber composite or other composite that is strong in compression, while the second composite can be a Kevlar composite or other composite that is strong in tension. In addition, a first wood veneer layer is disposed over the first composite material and a second wood veneer layer disposed over the second composite material. The wood veneers layers provide torsional stiffness, and provide a smooth veneer finish to make the wing more aerodynamically efficient.

The wing is also easy to construct, requiring no molds as is typically required with composite materials. In one embodiment, a method of constructing an aircraft wing includes applying uncured composite material over an upper surface and a lower surface of an airfoil shaped core. The composite material includes cloth substrate and uncured resin. Thereafter, wood veneer layers are applied over the uncured composite material, and compression forces are applied to the wood veneer layers and the resin is cured. The compression forces can be applied by, for example, vacuum bagging the wing. The wood veneer layers evenly distribute the compression forces to the underlying composite material during the curing of the resin. Therefore, the need for expensive molds to form the wing is eliminated.

DRAWINGS

FIG. 1 is a perspective view of the composite wing described herein.

FIG. 2 is a cross-sectional view of the composite wing taken along line 2-2 of FIG. 1.

FIG. 3 is an exploded view of an exemplary embodiment of the constituent components of the composite wing.

DETAILED DESCRIPTION

Figure 4:
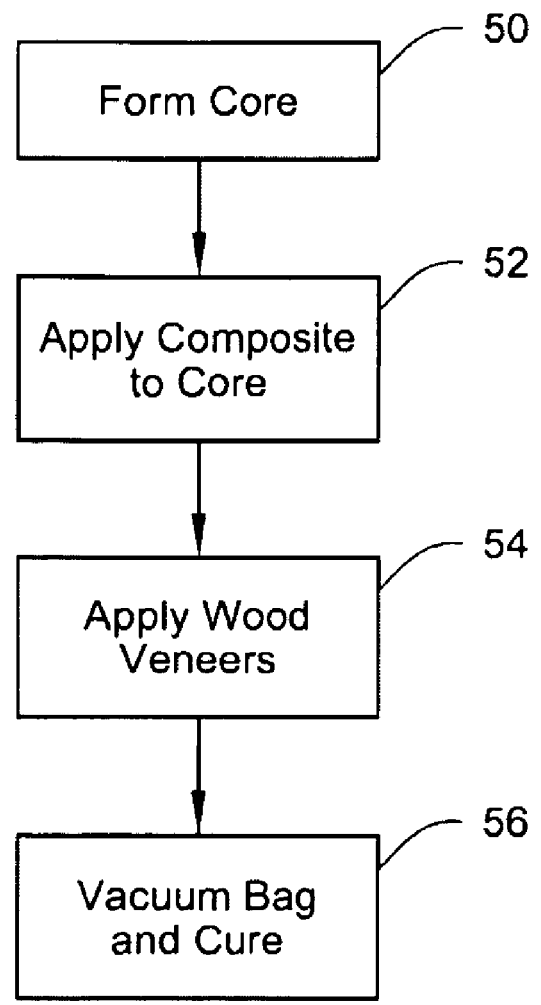
FIG. 4 illustrates the method used to form the wing.

With reference to FIG. 1, perspective view of a composite wing 10 is provided. FIG. 2 is a cross-sectional view of the composite wing 10 taken near a root end of the wing 10 is illustrated. The wing 10 is constructed according to the inventive concepts described herein. The wing 10 comprises a core 12, a first or upper composite material 14, a second or lower composite material 16, a first or upper thin wood veneer layer 18, and a second or lower thin wood veneer layer 20.

The core 12 has a root end 22 where the wing is attached to a fuselage of an aircraft, such as a UAV, to a tip end 24 (see FIG. 3). As seen from FIGS. 1 and 2, the core 12 has an airfoil shape with an upper surface 26 and a lower surface 28. Preferably the core 12 is solid from the root 22 to the tip 24, although cavities or voids could be formed at appropriate locations in the core 12, for example for fuel storage, if desired.

The core 12 can be formed of any suitable lightweight material. For example, the core can be formed from a foam material such as Styrofoam®, or other suitable foam material. The foam can be cut into the appropriate airfoil shape by CNC cutting the foam using a wire.

The first composite material 14 is bonded to the upper surface 26 of the core 12. The first composite material 14 comprises at least one layer of a composite material that is strong in compression, for example a carbon fiber composite. Preferably, a plurality of composite material layers are provided. For example, as illustrated in FIG. 3, three layers 14a, 14b, 14c are provided. However, less than three layers including a single layer could be used, and more than three layers could be used. An example of a composite material that is strong in compression and suitable for use on the wing 10 is 3 k tow carbon fiber fabric bonded with an epoxy or other resin. A suitable epoxy is available from West System of Bay City, Mich.

With reference to FIG. 3, the layers 14a, 14b, 14c are tapered in length L with layer 14a being longest, layer 14b the next longest, and layer 14c the shortest. Therefore, in the resulting wing 10, the composite material 14 is thicker near the root end 22 which is the region of highest stress.

In the case of a wing for a UAV having a wing-tip mounted antenna, the longest layer (i.e. layer 14a) preferably does not extend to the tip end 24. In this case, the wing is devoid of the first composite 14 near the tip end 24 which, when the first composite is made of conductive carbon fiber, helps minimize radio frequency interference with the wing-tip mounted antenna.

The second composite material 16 is bonded to the lower surface 28 of the core 12. The second composite material 16 comprises at least one layer of a non-conductive composite material that is strong in tension, for example an aramid fiber composite such as Kevlar®. Preferably, a plurality of composite material layers are provided. For example, as illustrated in FIG. 3, three layers 16a, 16b, 16c are provided. However, less than three layers including a single layer could be used, and more than three layers could be used.

With reference to FIG. 2, the layers 16a, 16b, 16c are tapered in length L with layer 16a being longest, layer 16b the next longest, and layer 16c the shortest. Therefore, in the resulting wing 10, the composite material 16 is thicker near the root end 22 which is the region of highest stress.

As with the composite material 14, in the case of a UAV the layers 16a, 16b, 16c preferably do not extend to the tip end 24 so that the wing is devoid of the second composite 16 near the tip end 24. However, since the composite material 16 is nonconductive, one or more of the layers 16a, 16b, 16c could extend to the tip end 24 without impacting RF transmissions of the antenna.

The thin wood veneer layers 18, 20 are disposed over the outer surfaces of the composite materials 14, 16, respectively. The veneers 18, 20 are pre-shaped to the general shape of the upper and lower surfaces 26, 28. Because the veneer layers 18, 20 are thin, they can easily bend to conform to the airfoil shape. The veneer layers 18, 20 also give torsional stiffness to the wing 10 and provide a smooth veneer wing surface that makes the wing aerodynamically efficient. The veneers can be, for example, European Birch plywood each having a thickness of about 0.03125 inch.

An exemplary process of forming the wing 10 will now be described with reference to FIG. 4. As an initial step, the core 12 must first be formed 50. The uncured composite material layer(s) 14a-c, 16a-c are then laid up over the upper surface 26 and the lower surface 28 of the core in step 52. The layers comprise cloth substrate, for example carbon fiber cloth or Kevlar cloth, and uncured resin such as epoxy. The layers can be laid up on the core "wet", i.e. the resin is applied to the cloth substrate prior to applying the layers being arranged on the core. Alternatively, the cloth substrates can be laid up on the core "dry", followed by application of the resin to the cloth substrates.

Once the uncured composite is applied to the core, the wood veneers are applied in step 54. Because the veneers are so thin, they can bend and conform to the shape of the underlying composite and core. The resin of the composite layers acts as the binding agent to bind the veneers to the wing. However, additional adhesive agent can be utilized in those areas that lack resin, for example at seams where the veneers 18, 20 meet (e.g. at the leading and trailing edges of the wing 10) or at the tip of the wing to bind the veneers to the core 12 due to the lack of composite at the tip.

Compression forces are then applied to the wood veneer layers and the resin is cured. The described construction of the wing 10 allows the compression forces to be applied using a vacuum bagging process in step 56. Vacuum bagging is known in the art. The uncured wing lay-up is vacuum bagged, and when the vacuum is applied to the bag, the bag applies compression forces to the wood veneers. The veneers generally evenly distribute the compression forces over the entire wing. At the same time the wing is being cured. A number of different processing conditions can be utilized to cure the wing. In one exemplary embodiment, the pressure applied by the vacuum bag to the veneers, and thus by the veneers to the composites, is about 5 psi, over a period of about 24 hours. At the end of curing, the wing is removed from the bag. Any additional processing on the wing, for example removal of rough edges such as by sanding, that may be deemed necessary can then be performed.

The finished wing is lightweight, yet strong enough to support the weight of the aircraft, for example a UAV that can weigh 200 pounds or more. In addition, in the case of a UAV having a wing-tip mounted antenna, the use of a thin layer of carbon fiber composite, which is conductive, and a non-conductive composite like Kevlar, together with the composites not extending all the way to the wing tip, minimize the RF impact of the wing on the antenna. Further, the wing can be formed without using expensive molds.

The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. An aircraft wing, comprising:
   a core having an airfoil shape with an upper surface and a lower surface;
   a first composite material over the upper surface;
   a second composite material over the lower surface, the second composite material is a different composite material than the first composite material; and
   a first wood veneer layer disposed over the first composite material and a second wood veneer layer disposed over the second composite material.

2. The aircraft wing of claim 1, wherein the core comprises a foam material.

3. The aircraft wing of claim 1, wherein the first composite material comprises a carbon fiber composite and the second composite material comprises a Kevlar composite.

4. The aircraft wing of claim 1, wherein the wing has a root and a tip, and the first composite material comprises a plurality of layers, and the layers have lengths that are tapered from the root towards the tip.

5. The aircraft wing of claim 4, wherein the layers do not extend to the tip.

6. The aircraft wing of claim 1, wherein the first composite material is semiconductive and the second composite material is nonconductive.

* * * * *